Oct. 17, 1939. J. P. WALKER ET AL Re. 21,239

METHOD OF RECOVERING WELL FLUIDS

Original Filed Jan. 2, 1937 2 Sheets-Sheet 1

Inventor
Jay P. Walker
Edwin V. Foran

By Jackel & Ashley,
Attorney

Oct. 17, 1939. J. P. WALKER ET AL Re. 21,239

METHOD OF RECOVERING WELL FLUIDS

Original Filed Jan. 2, 1937 2 Sheets-Sheet 2

Inventor
JAY P. WALKER
EDWIN V. FORAN

By

Attorney

Reissued Oct. 17, 1939 Re. 21,239

UNITED STATES PATENT OFFICE 21,239

METHOD OF RECOVERING WELL FLUIDS

Jay P. Walker, Tulsa, Okla., and Edwin V. Foran, San Antonio, Tex., assignors to Eureka Process Company, Tulsa, Okla., a corporation of Delaware Original No. 2,080,351, dated May 11, 1937, Serial No. 118,890, January 2, 1937. Application for reissue November 14, 1938, Serial No. 240,378

18 Claims. (Cl. 62—175.5)

Figure 1:
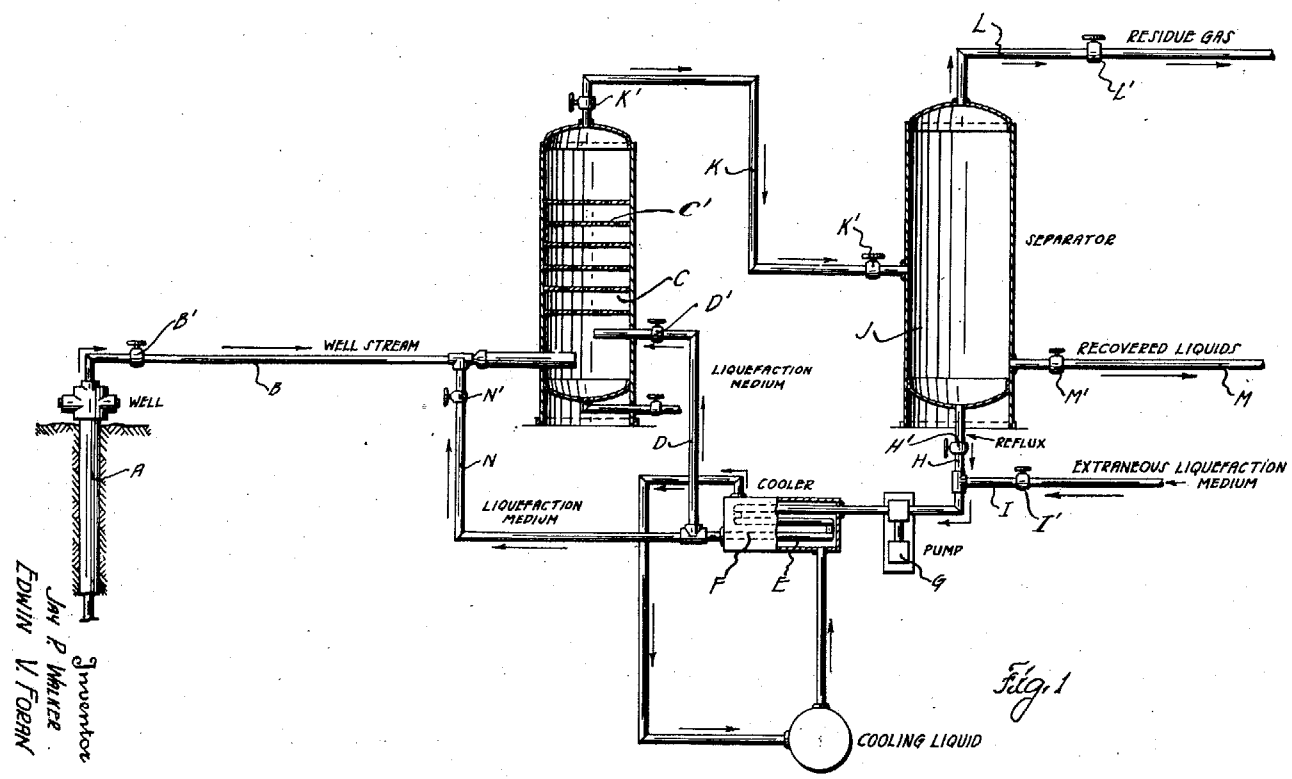

This invention relates to new and useful improvements in methods of recovering well fluids.

The invention has to do with the recovery of certain hydrocarbon fluids, usually produced or accumulated from the well stream or well fluids in a more or less vaporous form, which when converted into a liquid phase, will have the characteristics of the native liquids normally present in the well fluids; and also whereby the residual gas may be utilized or disposed of in any suitable manner, or recovered at such pressures as to make for economical and efficient delivery to input wells for preserving reservoir pressure and minimizing precipitation within the reservoir, and for displacing and replacing reservoir products, as well as for processing at a minimum cost of equipment, maintenance and operation.

In recent years wells have been drilled to deeper depths and the physical aspects of the gaseous products in the formations show a considerable change in character from the gaseous products normally in the more shallow pools. Among the most prominent of these changed characteristics of the deeper pools is the presence of some of the petroleum fractions, generally called "distillates", in a vaporous form and in increasing amounts as compared to the shallower pools, probably due to the higher subsurface temperatures and pressures prevailing in the deeper formations. When these fractions or products are converted or changed into a liquid phase, they may be approximately water-white in color, or in some instances may be more or less colored, and are generally known in the oil fields as "distillates".

Since the fixed gases in these relatively deeper pools, and vaporous products, are both in a common phase under sub-surface reservoir conditions, they are, therefore, not separable while in place in the reservoir under ordinary or controllable conditions. Consequently, when it becomes desirable to produce either the fixed gases or the vaporous products, it is substantially impossible to produce one without the other from the said common reservoir.

For economic reasons, certain of the products are in demand and may be readily marketed when recovered, and such products are usually those which can be converted by condensation, liquefaction, absorption, or other means, into a liquid phase. From this it follows that there may remain products which, for economical reasons, are not marketable or are not in current demand, and such products usually take the form of residual gas. To avoid the wasteful release of such gas, or other products, into the air or otherwise, it has been found feasible and practical, under certain conditions, to return the residual gas to a sub-surface reservoir, or to the source from which it was produced.

In the ordinary process or method of producing the vaporous products from the reservoir or bottom of the well, a certain amount of condensation from the vaporous form to the liquid phase usually occurs during the passage or transit of the gaseous fluids up the well from the bottom to the top, whether the means of conducting the fluids be through the casing of the well, or through the tubing, or both. Such condensation results primarily from the temperature change or drop which naturally takes place during the passage of the fluids from the high temperature horizon or zone at the base of the well through the progressively lower temperature horizons or zones upwardly toward the surface of the well. The condensation also is brought about by heat exchange, due to the flow of the warm vaporous products through the cooler casing and earth horizons encountered as the passage continues upward in the well.

When these products arrive at the surface they are, therefore, produced at a temperature usually considerably lower than their temperature at the base of the well bore. However, under common practice, the amount or quantity of liquids which is condensed during this passage is only a portion of those liquefiable fractions which could be condensed, were the process of heat exchanging and cooling to continue in the same manner or proportion. Due to the limitation of the natural heat exchange which, as above stated, takes place between the bottom of the well and the surface of the well, it becomes desirable to mechanically continue the process of heat exchanging at the surface, or to employ some other method to fully recover the liquefiable fractions from the vaporous products. It has been found economical and practical to recover, by an improved method, additional liquefiable products which remain in vaporous form because of the reasons above stated, and this is one of the objects of the invention; however, while the method is particularly applicable to the types of wells which have been described and are commonly known as distillate wells, there are many other types of wells producing gaseous fluids, as well as liquids, and containing liquefiable hydrocarbons, which are in such quantities as to make it profitable to use this method to recover such hydrocarbons.

In the methods or systems now in common use, it is the practice to use mineral seal or some other foreign oil as an absorbing medium, therefore before the recovered liquids can be used or sold, they must be treated to remove the mineral seal oil or other absorbent. Such a step requires heating or distilling and costly equipment and high operating costs are involved in extracting such an absorbent. So far as the recovery of liquids is concerned, it is not economically practical to use methods of the mineral seal type under usual conditions, at high pressures, and particularly where the residual gas is returned to the sub-surface reservoir.

The process or method of recovering the non-recovered fractions present in vaporous form or liquid phase, and remaining in the well fluids after the natural condensing of the liquefiable fractions by the transit of well fluids upwardly in the well, may be accomplished by using certain of a number of hydrocarbons as a densifying and liquefaction liquid. However, either the native liquid recovered from the well stream, or an equivalent having kindred characteristics, is used in our improved method, as best suited for the results sought.

It is, therefore, one of the objects of the method to separate the natural or native liquids which are to be recovered from the well fluids, or otherwise acquire them, and admix or introduce or inject the same or equivalent liquids, in a suitable manner or by suitable means, into the well fluids or the well stream, or the gaseous fluids of the well streams, at a desired point either in the upper end of the well, or on the surface, at some suitable stage in the method or system which may be in advance of a separating step, or between separating steps, or before final segregation of the liquids and gases. The admixture or introduction of these natural or native or other suitable liquids into the well fluids or well stream, in any of the ways set forth, serves to increase the liquid content of the fluids being treated to promote recovering therefrom additional native liquids.

A further object of the invention is to provide an improved method, wherein the liquid and liquefiable components of distillate range in the well stream or well fluids are brought into more intimate contact and the liquid content of such stream is increased, by the introduction of a native liquefaction liquid having substantially the same components as the liquid and liquefiable distillate fractions of said stream. By the introduction of such a liquefaction liquid in sufficient quantities and the consequent increase of the liquid content of the flowing stream, the liquid surface exposed for contact with the liquid and liquefiable fractions of the well stream is such that adequate surface is provided for the contact and collection of the desired distillate products of the said stream. The surficial area exposed for contact of the liquids of the well stream is increased or decreased in accordance with the quantity of the liquefaction liquid introduced and the liquid content is likewise increased or decreased.

Still another object of the invention is to provide an improved method of the character described wherein the recovery of liquefiable fractions of distillate range from well fluids may be carried out by admixing with such fluids a liquefaction liquid of the character described in advance or prior to a separating step; also a method whereby the liquefaction liquid may be introduced or admixed after a separating step or between separating steps; which variations of the method having the advantage of increasing the recovery of ascertained liquids in a practical and profitable manner and in increasing amounts without contaminating the well fluids being treated with foreign substances during the recovery steps, and also producing a residual gas capable of economic processing and requiring only minimum compression for introduction into a sub-surface reservoir.

A particular object of the invention is to provide an improved method for recovering well liquids of the character described which includes admixing with the well stream or well fluids, quantities of the native or natural liquid of distillate range and in excess of the normal distillate content of the well stream, whereby contamination of the recovered liquids with either a foreign liquid or a blending liquid or some other substance which either changes the recovered liquid from its natural components in the well or makes additional separation or distillation necessary, is prevented. So long as the liquefaction liquid has the characteristics herein set forth it may be acquired from any suitable source, but it is preferable and probably more economical to provide the same by utilizing quantities of the recovered liquids. In this latter event, it is desirable to accumulate the recovered liquid in such volume as to provide ample quantities for recycling the same as the liquefaction liquid. These also, are objects of the invention, as well as the selective controlling and regulating of the supply of liquefaction liquid over a wide range.

Another object of the invention is to provide an improved method whereby the fluids may be produced under well pressures, and the method performed without altering or reducing the well-head pressure, thus making it possible to carry out the steps at relatively high pressures for the purpose of saving gas, as well as for economic compression in order to raise the gas pressure to a degree suitable to return to a sub-surface reservoir. The advantage of this method resides to a great extent in the conservation of natural resources, whereby waste of the gaseous fluids is prevented.

A very important object of the invention is to provide an improved method involving the introduction into or the admixture with the well stream or well fluids of a cool liquefaction liquid of the character described, whereby the liquid content of the well stream is increased and the temperature thereof is reduced at a single step, thus making for increased liquefaction of the entrained liquefiable fractions in vaporous form, and utilizing heat exchange, as well as relatively high pressures; permitting control of the gas-to-liquid ratio and reducing atomization; and also affording highly profitable liquid recovery without resorting to sub-normal temperatures, the result being accomplished either by the inherent temperature of the liquefaction liquid or by first cooling said liquid.

A very important object of the invention is to provide an improved method utilizing a liquefaction liquid of the character described which may be pre-cooled, as hereinbefore set forth, or which owing to the inherent temperature of the well stream or well fluids need not be cooled; or wherein the well stream fluids may be cooled prior to the introduction of the liquefaction liquid; or wherein the well fluids and liquefaction liquid may be cooled after admixture, any of such procedures producing the desired liquefaction of the liquefiable fractions and the advantageous results herein set forth.

A further object of the invention is to provide an improved method for recovering well fluids wherein the composition of the products recovered are controlled by varying the rate of introduction of a liquefaction liquid introduced into or admixed with the well stream or fluid, or are controlled by regulating the temperature of the admixture, or by varying the rate of introduction of the liquefaction liquid so introduced, and controlling the temperature thereof at the same time.

Still another object of the invention is to provide a method wherein the well stream flowing from the well is admixed with a liquefaction liquid of the character described and carried through a stage wherein the travel of the well fluids and the liquefaction liquid is sufficiently amplified to effect an adequate admixture and consequent recovery of the desired distillates.

It is one of the objects of the invention to provide an improved method for recovering from well fluids flowing under pressure, certain liquid fractions, which are predominately in vapor phase form, as well as the residue gas; in an economical and efficient manner, whereby waste or gaseous fluids and liquids is prevented, costs are reduced and conservation of natural resources may be carried out.

Another object of the invention is to provide an improved method whereby the fluids which are produced from a well under pressure, and particularly those which are under relatively high pressure, may be separated with a minimum reduction in pressure loss, thus permitting said gas to be compressed to raise its pressure at a very low cost.

This application is filed as a continuation in part of our co-pending application filed May 26, 1936, Serial No. 81,968.

A construction designed to carry out the invention will be hereinafter described, together with other features of the invention.

Figure 2:
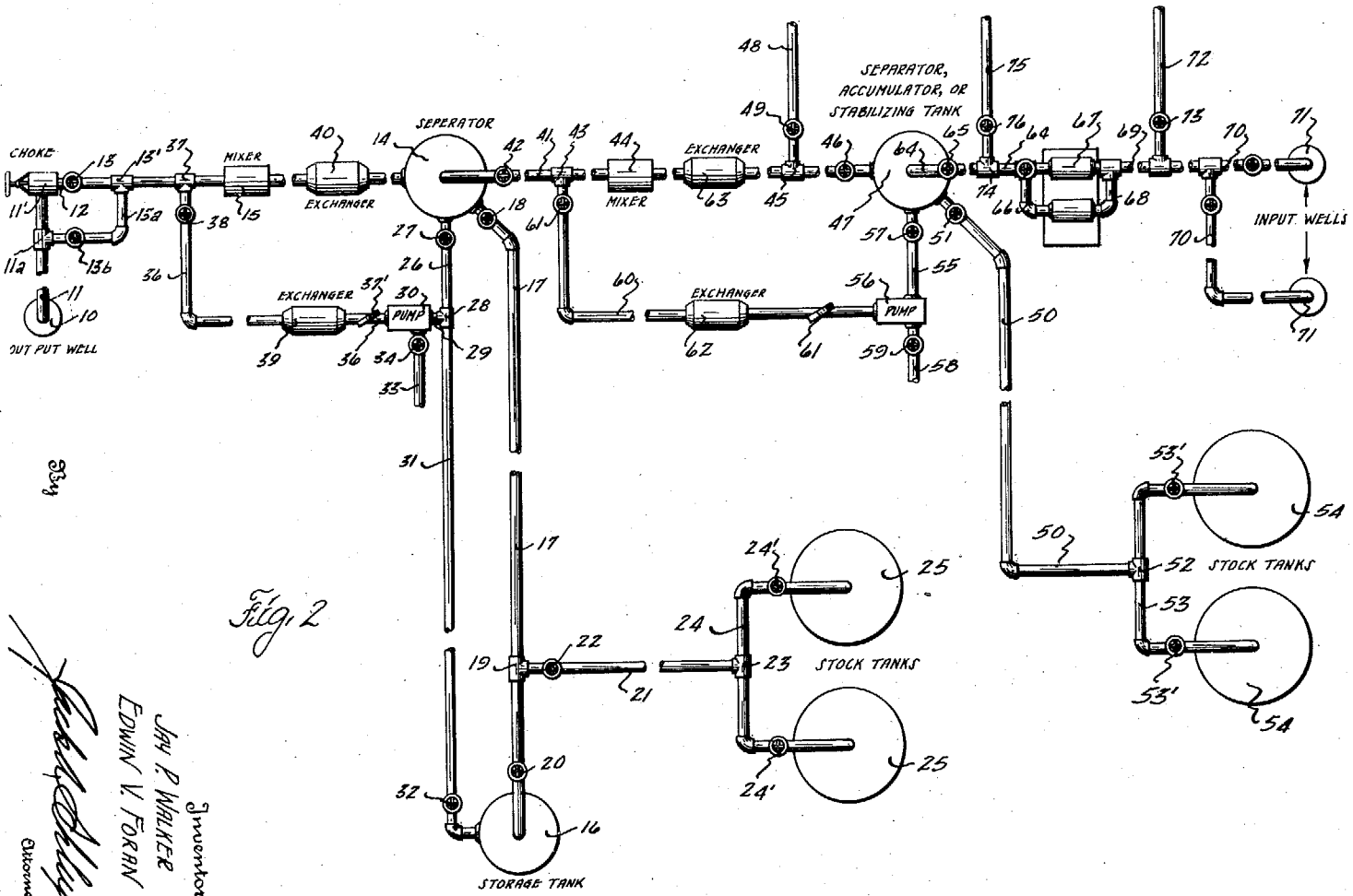

The invention will be more readily understood from a reading of the following specification and by reference to the accompanying drawings, in which an example of the invention is shown, and wherein:

Figure 1 is a diagrammatical view of an apparatus for carrying out the improved method, in accordance with the invention, and Figure 2 is a diagrammatical view of another apparatus for carrying out the improved method, in accordance with the invention.

The equipment set forth in Figure 1 is shown as an illustration of the application of the method to a distillate type of well.

In Figure 1 of the drawings, the letter A designates a well flowing under pressure. It is preferable to employ the method where the wellhead pressure is comparatively high, and of course, requires a flowing well or its equivalent.

The well stream is conducted through a pipe B from the well usually without a reduction in pressure, except for the reduction which takes place because of the flow. Where the wellhead pressure is very high, it may be desirable to reduce said pressure by a suitable means, as by valve B'. The well fluids flowing through the pipe B, while having a comparatively high pressure, will usually be largely in vaporous form, although including liquid phases. Such fluids will generally have a low oil-to-gas ratio.

As set out in the foregoing pages, the character of these distillate wells, to which the method is applicable, is somewhat different than the ordinary oil gas well, because the hydrocarbon liquid phase content of the well stream is not only low but the liquefiable fractions which are sought to be recovered are predominately in vaporous form and not subject to efficient recovery or separation by ordinary methods now in common use. These wells also usually flow under considerable pressure.

As before recited, it is highly desirable to maintain the flowing pressure within certain limits and permit as little pressure drop as is feasible in carrying out the method. This method involves the recovery of liquefiable fractions by increasing the liquid content of the well fluids through the introduction, or admixture therewith, of a liquefaction liquid, either with or without temperature variations. This method may also involve the control of the temperature of the well stream or well fluids together with the admixture of native or equivalent liquids with the well fluids for the purpose of increasing the liquid content of said fluids, thus accomplishing increased surficial contact and liquefaction of the liquefiable fractions for the subsequent separation of the liquids from the gases. The operation of this method at high pressures is advantageous since the degree of atomization or dispersion of liquid particles, prevailing under these conditions, is reduced to considerably less than would be the case if the admixture and subsequent separation were carried out at relatively low pressures.

Although the liquefaction liquid may have a lower temperature than the well stream or well fluids, at the point of introduction, it is not necessary to resort to extremely low or sub-normal temperatures for efficient liquid recovery. Not only is a reduction in the temperature of the well fluids secured by the heat exchange resulting from the contact of the components themselves, when the cool liquefaction liquid is introduced, but such introduction or admixture increases the liquid mass of the well fluids.

Many types of devices may be employed for introducing or injecting the liquefaction liquid into the well fluids or for admixing the same while under pressure. A container or tank C, has proven very satisfactory. The pipe B enters the tank at one side near the bottom. The interior of the tank may vary according to the conditions of operation and there may be baffles C' or any other suitable equipment for enhancing the mixing or heat exchanging, or both, by amplifying or prolonging the travel path of the admixed fluids.

The feed pipe D enters the lower portion of the tank for supplying the liquefaction liquid. This method, as before stated, involves the use of a liquid which, while preferably the native or natural liquid of the well stream, may be an extraneous liquid of the character described and which may be retained with the liquids as finally recovered. No extraneous liquid, such as a foreign oil, mineral seal oil for instance, can be used with this method, because such mediums either change the components of the recovered liquid or must be separately extracted at a greatly increased expense.

The character of the recovered liquid products may be controlled to a great extent by regulation of the temperature within the tank C, or by the quantity of the liquefaction medium introduced thereinto. A hand valve D' is connected in the pipe D for controlling the supply of the liquefaction liquid. This pipe extends to the coil E of a cooler or heat exchanger F of suitable construction. The coil is connected with the force pump G, whereby the liquid is delivered to the tank at a pressure suitable to insure its entrance into the same for circulation therethrough.

A supply pipe H extends from a high pressure separator J to the pump and is connected with a supply pipe I. The pipe H includes a valve H' between the separator and the pipe I, while the pipe I includes a valve I'. If native liquid is used the valve I' is closed, the valve H' opened, and said liquid is supplied from the separator; whereas if extraneous liquid is used, the valve H' is closed, the valve I' is opened, and the liquid is supplied from a suitable source through the pipe I.

If desired, the valve D' may be closed and the liquefaction liquid or recirculation liquid may be introduced into the pipe B in advance of the tank C through a pipe N, which includes a valve N'. If this latter step is followed, the admixing of the liquefaction liquid in the well stream will bring about a temperature change in the stream prior to entering the tank C, however, as before pointed out, it is possible to introduce the liquefaction liquid into the well stream without causing a temperature change.

A discharge pipe K leads from the top of the tank to the separator. The liquefaction medium will thoroughly admix with the well fluids while flowing upwardly therewith through the tank C. The said admixing of the liquid with the well fluids will cause a liquefaction and precipitation of the liquefiable fractions which are in vaporous form, by its intimate or surficial contact therewith, thus making it possible to increase the recovery of the liquefiable fractions from the well fluids.

Ordinarily, the primary well stream of these distillate type wells is substantially composed of free gases not subject to appreciable liquefaction, fractions in vaporous form which are liquefiable, and other fractions in the liquid phase. These components prevail in a state in which the liquid phase fractions are highly dispersed or atomized and form a more or less homogeneous mixture with the gases and liquefiable vaporous fractions.

In the process of admixing, a major change in the character of the well stream fluids takes place in the form of an increased liquid content which results in a unification of the highly atomized or dispersed liquid particles in the primary well stream fluids with the more massive liquid particles of the liquefaction liquid. During this step, in which the unification of the atomized and more massive liquid particles takes place, the resultant liquid and gas admixture is prepared for separation, which is efficiently accomplished due to the fact that the atomized or highly dispersed particles have united or combined with the more massive liquid particles of the medium. During the process of admixture any cooling of the fluids which may take place will further increase the recovery of liquefiable fractions from the combined fluids. The fluids enriched by the liquefaction liquid flow from the tank C, under substantially high pressure, out through the pipe K. This stream flowing through the pipe K has a much greater liquid content or liquid to gas ratio than the well stream as it flows from the well and enters the high pressure separator J, preferably at midheight, wherein separation of the liquids from the gas takes place. The pipe K includes valves K', which may be control or regulating valves, or any other kind of valves suitable for use in this method.

The well stream or fluids having been prepared for separation prior to their entrance into this separator J will yield to separation therein, the liquids descending to the lower portion of the separator, and the gases rising and passing out through the pipe L, which includes a pressure control valve L'. The recovered liquids are discharged through the outlet pipe M which includes a control valve M' which may be either of the manually operated type or of the automatically operated type. Any portion of such liquids may be bled through the pipe H for use as a liquefaction liquid. The liquid discharged through the pipe M requires no further treatment and is ready for use, ordinarily as a commercial product.

It is pointed out that by regulating the operation of the pump G the quantity and rate of introduction of the liquefaction liquid into either the tank C or the pipe B may be controlled. At some stages in the practice of the method, it may be desirable to employ more or less quantities of liquefaction liquid in order to procure the most efficient recovery of liquefiable fractions. Thus the provision of an ample supply of the liquefying liquid is most desirable and, of course, such liquid may best be used after the separation of the gases therefrom.

It will be obvious that the lean or denuded gas discharged into the pipe L at the top of the separator J will usually be only slightly lower in pressure than the pressure of the flowing well fluids entering the tank C. If the gas is to be returned to a sub-surface reservoir, its pressure usually should be kept as high as possible for this purpose. It is evident that if the pressure of the well stream or fluids is considerably reduced during a recovery method, then more compression is required in order to raise the pressure of the residual gas for input purposes. The method herein recited involves recovery of the liquefiable fractions with minimum pressure loss throughout the system, thus making it possible to greatly reduce the cost and operation of compression equipment required for returning gas to reservoirs under high pressure.

As hereinbefore pointed out, our method may be used with other than wholly distillate type wells, and some of these other types of wells may produce more or less oil, as well as vaporous form fluids containing liquefiable hydrocarbons of distillate range which are in sufficient quantities to make it profitable to recover. We have illustrated in Figure 2 equipment for performing the method with these types of wells. In this figure, the numeral 10 designates a well flowing under pressure from which the well fluids are conducted by a pipe 11 through a choke 11'. The choke is, in turn, connected with one end of a flow line pipe, or conductor 12. By means of the choke, which is adjustable, the flow of the well stream from the pipe 11 to the line 12 may be readily controlled. A T 13' is connected in the line 12 and a valve 13 is interposed in said line between the T and choke. In case it is not desired to pass the well stream through the choke the valve 13 may be closed and said stream carried through a by-pass line 13a which has one end connected to the T 13' while its other end is connected in a T 11a in the line 11. When this line 13a is not being used it is closed by a valve 13b. The other end of the flow pipe 12 leads into a separator 14 which may be of any desired construction, according to the nature of the products being handled, and a mixer 15, which may be similar to the tank C of Figure 1 as will be explained, is connected in the pipe 12.

The type of well to which the equipment shown in Figure 2 is applied produces with the gaseous fluids, liquid of lower volatiles than distillates, and these lower volatiles must of a necessity, be recovered, either by separation or some other methods, from the gaseous fluids prior to extraction of the distillates from the said gaseous fluids. However, after primary separation there is usually present in the gaseous fluids large quantities of distillates which must be separately recovered. Therefore, by introducing the well stream or well fluids into the separator 14, the liquid low volatile hydrocarbons present in such fluids or stream as it flows from the well are separated from the gaseous fluids which contain the recoverable liqueflable fractions of distillate range.

The residual liquids recovered in the separator 14 may be conducted to a storage tank 16 by an outlet pipe 17, which pipe has a control valve 18 connected therein. This valve may be operated either automatically or manually. It is to be noted that the character of the liquids flowing from the separator may vary to a great extent and, of course, will depend upon the nature of the liquids of the well stream.

The liquids which are separated in the separator 14 may be conducted to the storage tank 16, or other disposition may be made thereof. A T 19 is connected in the pipe 17 in advance of a valve 20, which may be closed to cut off the flow to the tank 16. A pipe 21 leads from the T and includes a cutoff valve 22.

By closing the valve 20 and opening the valve 22, the liquids may be conducted to a T 23, which is connected to a manifold 24, which, in turn, is connected to stock tanks 25. Suitable control valves 24' are located in the manifold 24 adjacent each tank 25 and control the flow of liquid into the tanks. From the above, it will be evident that by manipulating the valves 20 and 22 the liquid recovered in the separator 14, may be conducted either to the storage tank 16 or the stock tanks 25.

In some instances, it may be desirable to utilize the liquids separated in the separator 14 as a liquefaction liquid and introduce or inject the same into the well stream or well fluids in advance of the separator 14. For this purpose, a second outlet pipe 26 having a valve 27 connected therein leads from the lower end of the separator. The outer end of this pipe is connected to a T 28 and a short pipe 29 leads from the T to a suitable pump 30. The outer side of the T 28 has a pipe 31 extending therefrom and the opposite end of this pipe leads to the storage tank 16. A suitable valve 32 is connected in the pipe 31. With this arrangement, the pump may be supplied with liquid either direct from the separator through the pipe 26 or from the storage tank 16, or from both. It might be desirable to supply the pump with an extraneous liquid and for this purpose an inlet pipe 33 leading from a suitable source of supply is connected to the pump 30. A suitable control valve 34 is connected in said pipe.

The pump 30 forces the liquid through a pipe 36 which has a pressure gauge therein, whereby the pressure of the liquid being pumped may be determined. In place of the pump, any suitable means may be used for propelling the liquid and placing it under a desired pressure. The other end of the pipe 36 is connected to a T 37 which T is connected in the flow line 12 between the mixer 15 and valve 13, whereby the liquid is pumped into the flow in advance of the separator. The pipe 36 includes a control valve 38 located adjacent the flow line and a pressure gauge 37'.

A suitable heat exchanger 39 is located in the pipe 36 and is so arranged as not to interfere with a free passage of the liquid when not in operation. The exchanger may be utilized to heat the liquid or to cool it, and its purpose, when used, is to bring the liquefaction liquid to the proper temperature. Many conditions, such as seasonal changes, climatic variations, and temperatures of the liquids themselves may make the use of the exchanger unnecessary and as it may, under some of these conditions, be omitted, the invention is not to be limited to a heat exchanging step.

From the above, it will be seen that the well stream is conducted to the separator 14 wherein the liquids are separated from the gaseous fluids. These separated liquids may be carried to the storage tank 16 or the stock tanks 25, or both; or they may be conducted to the pump, either from the separator 14 or tank 16, or both, for recycling as a liquefaction liquid. When conducted to the pump, they are forced into the pipe 36 and introduced into the flow line 12. When so introduced, it is of course necessary that the liquefaction liquid be placed under sufficient flowing pressure to enter the flowing well fluids. The introduction of the liquefaction liquid will increase the liquid content of the well fluids, as has been explaned, whereby liqueflable fractions present in vaporous form in said fluids are accumulated and united with the liquids entrained in said fluids. The admixed well fluids and liquefaction liquid flowing through the pipe 12 pass into and through the mixer 15, which latter could also be the tank C of Figure 1. While the mixer or tank may be, in some instances, omitted, it is desirable to use the same in order to obtain a more intimate mixture of the components of the gaseous fluids and liquids flowing therethrough. Under some conditions, it may be desirable or advantageous to connect a heat exchanger 40 in the pipe 12 between the mixer and separator 14 and use the same in conjunction with, or independently of, the exchanger 39; however, the exchanger 40 may be omitted entirely.

When the liquefaction liquid is introduced into the line 12, as above explained, liqueflable fractions are accumulated and subsequently separated in the separator from the gaseous fluids, passing off with the liquids. If the recycling of the liquids recovered in the separator is not desirable, then it is only necessary to close the valves 27, 32, and 38 in the pipes 26, 31, and 36 respectively, and open the valve 18 in the outlet pipe 17, whereby the separated liquids may be conducted to the tank 16 or stock tanks 25.

The gaseous fluids of the well stream, which are separated from the liquids in the separator 14, are conducted therefrom by a flow line 41 which leads from the upper end thereof. These gaseous fluids usually contain liqueflable fractions which are not recoverable in the separator. The flow line 41 has connected therein, in the order named, a valve 42, a T 43, a mixer 44, which may be similar to the mixer 15, a T 45 and a valve 46. The other end of the line 41 leads into a tank 47, which may be a separator, accumulator or stabilizer. A pipe 48 including a valve 49 is connected to the T 45, whereby any of the gaseous fluids flowing through the line 41 may be taken therefrom for any purpose.

From the above, it is manifest that the gaseous fluids are conducted from the separator 14 to the tank 47. The liquids which are recovered in this latter tank may be taken therefrom through an outlet pipe 50 which has a valve 51 connected therein. The outer end of the pipe 50 is connected to a T 52 which is, in turn, connected to a manifold 53 leading to stock tanks 54. The manifold includes suitable control valves 53' for controlling the flow into said tanks.

In order to recover the liquefiable fractions present in the gaseous fluids flowing through the line 41, it is desirable to recycle as a liquefaction liquid quantities of the liquids which have been recovered in the tank 47. For this purpose, a second outlet pipe 55 leads from the tank 47 to a suitable pump 56, similar to the pump 30. A suitable valve 57 is connected in the pipe 55. For supplying an extraneous liquefaction liquid of the character described in connection with Figure 1, a supply pipe 58 including a valve 59 is connected to the pump 56. This extraneous liquid may or may not be supplied, as desired.

The pump forces the liquefaction liquid supplied thereto through a pipe 60 which has its other end connected to the T 43 in the flow line 41 in advance of the mixer 44, whereby the liquid is introduced into the flowing gaseous fluids. The pipe 60 has a pressure gauge 61, as well as a heat exchanger 62, similar to the exchangers 39 and 40, connected therein. As is the case of the exchangers 39 and 40, the exchangers 62 and 63 may or may not be used.

The liquefaction liquid introduced into the flow line 41 will admix with the gaseous fluids flowing therethrough and the liquefiable fractions of distillate range will be accumulated so that upon their introduction to the tank 47, these liquefiable fractions will be recovered as liquids. The gaseous fluids and the liquefaction liquid introduced thereinto will pass through the mixer 44 and will be thoroughly admixed before their entrance into the tank. If desired, a heat exchanger 63, similar to the exchangers 39, 40, and 62 may be connected in the line 41 between the mixer 44 and T 45.

With the above arrangement, it will be seen that the gaseous fluids which are separated from the liquids of the well stream in the separator 14 may be admixed with a liquefaction liquid prior to their entrance into the tank 47, whereby the liquefiable fractions present in said fluids are recovered as liquids. The liquefaction liquid may be quantities of the liquids recovered in the tank 47, or such liquid may be extraneous, being supplied through the pipe 58.

It is pointed out that the system herein described is very flexible for by manipulating the various valves, the well stream may be admixed with a liquefaction liquid prior to a separating step or after an initial separation of liquids and gaseous fluids; or the well fluids may be treated both before and after a separating step. In all cases, the liquefiable fractions normally present in vaporous form are economically recovered.

The residual gas which is separated from the liquid in the tank 47 is substantially denuded of liquefiable fractions and is discharged from said tank through a pipe 64 which has a valve 65, either manual or automatic, connected therein. The gaseous fluids which are discharged from the separator 14 into the pipe 41 or from the tank 47 into the pipe 64, are under pressure, which may vary but which usually will be comparatively high. Within certain limits and ranges, this pressure may be maintained and controlled and, therefore, excessive and wasteful pressure losses or drops may be avoided. This is highly desirable, particularly for economic reasons, where the gas is to be compressed to raise its pressure for injection into input wells, as well as for other reasons.

The pipe 64 is connected with the inlet manifold 66 of a compressor unit 67. The discharge manifold 68 of the unit connects with a pipe 69 which, in turn, is connected with one or more branch pipes 70 leading to input wells 71. It is pointed out that the pipes 70 are broken to indicate that the input wells are preferably remote. A service pipe 72 including a valve 73 also extends from the pipe 69 for conducting the compressed gas therefrom for other purposes. When the gas is not to be compressed, a T 74 is connected in the gas discharge line 64 and a pipe 75 including a valve 76 leads from said T. By conducting the gas from the pipe 75, said gas may be returned to a sub-surface reservoir having a less pressure than the pressure of the reservoir of the well 10. In such case, compression is not necessary.

It is to be noted that under some conditions the best results may be obtained in this method where the quantity of liquefaction liquid introduced is greater, or many times as great, as the recoverable liquid content of the well fluids flowing from the well at the point of introduction; however, the method is not to be limited either to the amount or proportion of the liquefiable liquid introduced or its rate or point of introduction.

As used herein, the terms "well fluids" and "well stream" mean the fluids produced by the well, irrespective of their treatment or disposition. The term "fluids" is generic and refers to liquids, vapors, gaseous fluids and so-called gases.

The term "vaporous form" as used herein, is intended to cover all fluids having the form of vapors, mists or gaseous fluids. The term "recovered liquids", "liquids recovered", "liquid recovery", or "separated liquids", may be applied to the liquids which are normally present in the well stream either in liquefiable form or in liquid form and which are accumulated, recovered or separated at some stage in the method; and may also include the liquefaction liquid which is added.

By the term "liquid content", is meant either or both liquid and liquefiable fractions present in the well stream. The term "liquids of distillate range" covers both liquids and liquefiable fractions which are classed as distillates and as distinguished from heavy hydrocarbons.

It is pointed out that the invention deals with the recovery of certain products of hydrocarbons classified as distillates and flowing from the well in vapor form or as liquefiable fractions. It is the purpose to precipitate these fractions and recover them as native liquids without adulterating them. The invention seeks to avoid admixing with the native well gases or liquids, when treating such gases, any blending liquid, foreign liquid or heavier hydrocarbon. The liquefaction liquid should not contain any components which are not within the range of the liquids to be extracted from the gaseous fluid. Therefore, it is preferable, but not necessary, to accumulate the recovered native liquid and recycle it as the liquefaction liquid. It is also true that there may be produced with the gaseous fluids, quantities of water vapors, which may condense during the operation of the method and this water may be drawn off. Possibly some of this naturally present water may still remain in the liquefaction liquid when recycled, but it is to be understood that the presence of such water is not necessary to the performance of the method.

The terms "distillate" or "distillates" or "of distillate range", as applied in this application, refer to the recoverable products of high A. P. I. gravity range, produced from the so-called "distillate wells" and from oil wells which produce a separable liquid and a gaseous fluid, from which the separable liquid may be primarily extracted by conventional oil and gas separation, and the "distillate" or high A. P. I. gravity liquids are later recovered from the gaseous fluid which has been separated from the crude oil and are of such components that they come within the scope of the so-called "distillate" or "distillates" or "of distillate range" as applied in our method. However, no present nomenclature has been found on the terms above applied except the general and common oil country terminologies above recited when referred to such wells, and in some cases these same wells are commonly called "water white wells", or "water white distillate wells", and these same wells and products are often referred to as such in trade and other publications for the oil industry. Through one of the inconsistencies of nature and contrary to common knowledge, the hydrocarbons herein called "distillates" occur in vaporous or gaseous form under pressures within the range of retrograde condensation, whereas at pressures below the range of retrograde condensation many of these same hydrocarbons occur in the liquid phase. The well stream flowing from these wells while including numerous hydrocarbons is predominately gaseous and its predominating component is usually methane, which may run as high as ninety (90%) per cent or even higher. The retrograde range begins to affect condensation so far as is now known, at somewhere between 600 and 1500 pounds pressure and may extend beyond several thousand pounds pressure. The reservoir temperatures seem to range from approximately 100 degrees F. upward, recoveries having been made from a reservoir at a depth of 4800 feet having a temperature of approximately 150 degrees F. These figures are merely explanatory and are so used. The invention is not to be construed as intended to include the recovery of all and every hydrocarbon of the well stream, but as directed to the recovery of certain well products of the so-called distillate range.

What we claim and desire to secure by Letters Patent is:

1. The method of recovering natural distillate products from wells producing such products in gaseous form which includes, conducting the well stream containing said natural distillate products from a well flowing under high pressure, admixing with the gaseous fluids of the well stream at a temperature not in excess of the natural maximum temperature of the well stream, a liquefaction liquid having substantially the same composition as the natural distillate liquids to be recovered from the gaseous well stream and in such quantities as to produce in the admixture a total liquid content in excess of the normal amount of such natural components contained in said well stream, said liquefaction liquid being introduced in the form of relatively large particles so as to minimize atomization thereof and the formation of mist, concurrently flowing the admixed fluids while subjected to amplified surficial contact whereby natural distillate liquid particles of such size and weight as to induce precipitation and increased liquid recovery are agglomerated with the liquefaction liquid, and separating the gas from said liquid particles to recover the natural liquids.

2. The method of recovering natural distillate products from wells producing such products in gaseous form which includes, conducting the well stream containing said natural distillate products from a well flowing under high pressure, admixing with the gaseous fluids of the well stream at a temperature not in excess of the natural maximum temperature of the well stream, a liquefaction liquid having substantially the same composition as the natural distillate liquids to be recovered from the gaseous well stream and in such quantities as to produce in the admixture a total liquid content in excess of the normal amount of such natural components contained in said well stream, said liquefaction liquid being introduced in the form of relatively large particles so as to minimize atomization thereof and the formation of mist, concurrently flowing the admixed fluids while subjected to amplified surficial contact whereby natural distillate liquid particles of such size and weight as to induce precipitation and increased liquid recovery are agglomerated with the liquefaction liquid, separating the gas from said liquid particles to recover the natural liquids, and recycling portions of the recovered distillate liquids and utilizing said recycled liquids as the liquefaction liquid.

3. The method of recovering natural distillate products from wells producing such products in gaseous form which includes, conducting the well stream containing said natural distillate products from a well flowing under high pressure, conducting the well stream through a separating stage to remove extraneous hydrocarbons and liquid products, flowing the residual well stream containing the natural distillate well products to be recovered from the separating stage under high pressure, admixing with the gaseous fluids of the well stream at a temperature not in excess of the natural maximum temperature of the well stream, a liquefaction liquid having substantially the same composition as the natural distillate liquids to be recovered from the gaseous well stream and in such quantities as to produce in the admixture a total liquid content in excess of the normal amount of such natural components contained in said well stream, said liquefaction liquid being introduced in the form of relatively large particles so as to minimize atomization thereof and the formation of mist, concurrently flowing the admixed fluids while subjected to amplified surficial contact whereby natural distillate liquid particles of such size and weight as to induce precipitation and increased liquid recovery are agglomerated with the liquefaction liquid, and separating the gas from said liquid particles to recover the natural liquids.

4. The method of recovering natural distillate products from wells producing such products in gaseous form which includes, conducting the well stream containing said natural distillate products from a well flowing under high pressure, admixing with the gaseous fluids of the well stream at a temperature not in excess of the natural maximum temperature of the well stream, a liquefaction liquid having substantially the same composition as the natural distillate liquids to be recovered from the gaseous well stream and in such quantities as to produce in the admixture a total liquid content in excess of the normal amount of such natural components contained in said well stream, said liquefaction liquid being introduced in the form of relatively large particles so as to minimize atomization thereof and the formation of mist, concurrently flowing the admixed fluids while subjected to amplified surficial contact whereby natural distillate liquid particles of such size and weigth as to induce precipitation and increased liquid recovery are agglomerated with the liquefaction liquid, separating the gas from said liquid particles to recover the natural liquids, and recycling and cooling portions of the recovered liquids and utilizing said recycled liquids as the liquefaction liquid, whereby the admixing of the liquefaction liquid with the gaseous well stream is carried out at a relatively low temperature and the recovery of liquefiable fractions is increased.

5. The method of recovering natural distillate products from wells producing such products in gaseous form which includes, conducting the well stream containing said natural distillate products from a well flowing under high pressure, admixing with the gaseous fluids of the well stream prior to separation of the liquids from the gases of said stream and at a temperature not in excess of the natural maximum temperature of the well stream, a liquefaction liquid having substantially the same composition as the natural distillate liquids to be recovered from the gaseous well stream and in such quantities as to produce in the admixture a total liquid content in excess of the normal amount of such natural components contained in said well stream, said liquefaction liquid being introduced in the form of relatively large particles so as to minimize atomization thereof and the formation of mist, concurrently flowing the admixed fluids while subjected to amplified surficial contact whereby natural distillate liquid particles of such size and weight as to induce precipitation and increased liquid recovery are agglomerated with the liquefaction liquid, and separating the gas from said liquid particles to recover the natural liquids.

6. The method of recovering natural distillate products from wells producing such products in gaseous form which includes, conducting the well stream containing said natural distillate products from a well flowing under high pressure, admixing with the gaseous fluids of the well stream at a temperature not in excess of the natural maximum temperature of the well stream, a liquefaction liquid having substantially the same composition as the natural distillate liquids to be recovered from the gaseous well stream and in such quantities as to produce in the admixture a total liquid content in excess of the normal amount of such natural components contained in said well stream, said liquefaction liquid being introduced in the form of relatively large particles so as to minimize atomization thereof and the formation of mist, concurrently flowing the admixed fluids through a prolonged travel path and under constant turbulence while subjected to amplified surficial contact whereby natural distillate liquid particles of such size and weight as to induce precipitation and increased liquid recovery are agglomerated with the liquefaction liquid, and separating the gas from said liquid particles to recover the natural liquids.

7. The method of recovering natural distillate products from wells producing such products in gaseous form which includes, conducting the well stream containing said natural distillate products from a well flowing under high pressure, admixing with the gaseous fluids of the well stream, at a temperature not in excess of the natural maximum temperature of the well stream, a liquefaction liquid having substantially the same composition as the natural distillate liquids to be recovered from the gaseous well stream and in such quantities as to produce in the admixture a total liquid content in excess of the normal amount of such natural components contained in said well stream, said liquefaction liquid being introduced in the form of relatively large particles so as to minimize atomization thereof and the formation of mist, concurrently flowing the admixed fluids while subjected to amplified surficial contact whereby natural distillate liquid particles of such size and weight as to induce precipitation and increased liquid recovery are agglomerated with the liquefaction liquid, separating the gas from said liquid particles to recover the natural liquids, and recycling portions of the recovered distillate liquids as the liquefaction liquid and varying the rate of introduction of said liquefaction liquid to control the recovery of the products.

8. The method of recovering native hydrocarbon products occurring in gaseous form in the reservoir at pressures within the range of retrograde condensation which includes, flowing the well stream containing said native hydrocarbon products from the well at a pressure within the range of retrograde condensation, admixing with the well stream a liquefaction fluid including hydrocarbon components of substantially the same composition as some of the native hydrocarbon components to be recovered from the well stream and in such quantities as to induce precipitation and increased recovery of the liquefiable fractions of the well stream while maintaining said stream under high pressure, flowing the admixed fluids while subjected to surficial contact under high pressure, whereby the native liquefiable fractions are precipitated and agglomerated with the liquefaction fluid and the native liquids of the well stream, and separating the gas from the agglomerated liquids at a high pressure.

9. The method of recovering native hydrocarbon products occurring in gaseous form at pressures within the range of retrograde condensation which includes, flowing the well stream containing said native hydrocarbon products from the well at a pressure within the range of retrograde condensation, admixing with the well stream a liquefaction fluid including hydrocarbon components of substantially the same composition as some of the native hydrocarbon components to be recovered from the well stream and in such quantities as to induce precipitation and increased recovery of the liquefiable fractions of the well stream and while maintaining said stream under high pressure, flowing the admixed fluids while subjected to surficial contact under high pressure, whereby the native liquefiable fractions are precipitated and agglomerated with the liquefaction fluid and the native liquids of the well stream, separating the gas from the agglomerated liquids at a high pressure, and recycling portions of the recovered hydrocarbon liquids as the liquefaction fluid under high pressure within said retrograde condensation range.

10. The method of recovering native hydrocarbon products occurring in gaseous form at pressures within the range of retrograde condensation which includes, flowing the well stream containing said native hydrocarbon products from the well at a pressure within the range of retrograde condensation, admixing with the well stream a liquefaction fluid including hydrocarbon components of substantially the same composition as some of the native hydrocarbon components to be recovered from the well stream and in such quantities as to induce precipitation and increased recovery of the liquefiable fractions of the well stream and while maintaining said stream under high pressure, flowing the admixed fluids while subjected to surficial contact under high pressure, whereby the native liquefiable fractions are precipitated and agglomerated with the liquefaction fluid and the native liquids of the well stream under high pressure, separating the gas from the agglomerated liquids under high pressure, recycling portions of the recovered hydrocarbon liquids as the liquefaction fluid, and cooling the recycled liquefaction liquid prior to a mixing with the well stream.

11. The method of recovering native hydrocarbon products occurring in gaseous form in the reservoir at pressures within the range of retrograde condensation which includes, flowing the well stream containing said native hydrocarbon products from the well at a pressure within the range of retrograde condensation, admixing with the well stream a liquefaction fluid including hydrocarbon components of substantially the same composition as some of the native hydrocarbon components to be recovered from the well stream and in such quantities as to induce precipitation and increased recovery of the liquefiable fractions of the well stream while maintaining said stream under high pressure, flowing the admixed fluids while subjected to surficial contact under high pressure, whereby the native liquefiable fractions are precipitated and agglomerated with the liquefaction fluid and the native liquids of the well stream, and separating the gas from the agglomerated liquids under high pressure within said retrograde condensation range.

12. The method of recovering native hydrocarbon products from a well at pressures within the range of retrograde condensation which includes, flowing a well stream including said native hydrocarbon products from the well at a pressure within the range of retrograde condensation, primarily extracting from the well stream heavier hydrocarbon liquids than those which are to be ultimately recovered, admixing with the well stream a liquefaction fluid including hydrocarbon components of substantially the same composition as some of the native hydrocarbon components recoverable from the well stream and in such quantities as to induce precipitation and increased recovery of liquefiable fractions of the well stream while maintaining said stream under a high pressure, flowing the admixed fluids concurrently while subjected to surficial contact under high pressure, whereby native liquefiable fractions are precipitated and agglomerated with the liquefaction fluid and the native liquids of the well stream, and separating the gas from the agglomerated liquids under high pressure within said retrograde condensation range.

13. The method of recovering native hydrocarbon products from a well at pressures within the range of retrograde condensation which includes, flowing a well stream including said native hydrocarbon products from the well at a pressure within the range of retrograde condensation, cooling the well stream, admixing with the well stream a liquefaction fluid including hydrocarbon components of substantially the same composition as some of the native hydrocarbon components to be recovered from the well stream and in such quantities as to induce precipitation and increased recovery of liquefiable fractions of the well stream while maintaining said stream under high pressure, flowing the admixed fluids concurrently while subjected to surficial contact under high pressure, whereby native liquefiable fractions are precipitated and agglomerated with the liquefaction fluid and the native liquids of the well stream, separating the gas from the agglomerated liquids under high pressure within said retrograde condensation range, and recycling a portion of the separated liquid as the liquefaction fluid.

14. The method of recovering native hydrocarbon products from a well at pressures within the range of retrograde condensation which includes, flowing a well stream including said native hydrocarbon products from the well at a pressure within the range of retrograde condensation, cooling the well stream, extracting from the well stream heavier hydrocarbon liquids than those which are to be ultimately recovered, admixing with the well stream a liquefaction fluid including hydrocarbon components of substantially the same composition as some of the native hydrocarbon components to be recovered from the well stream and in such quantities as to induce precipitation and increased recovery of liquefiable fractions of the well stream while maintaining said stream under high pressure, flowing the admixed fluids concurrently while subjected to surficial contact under high pressure, whereby native liquefiable fractions are precipitated and agglomerated with the liquefaction fluid and the native liquids of the well stream, and separating the gas from the agglomerated liquids under high pressure within said retrograde condensation range.

15. The method of recovering native hydrocarbon products from a well at pressures within the retrograde condensation range which includes, flowing a well stream including said native hydrocarbon products from the well at a pressure within the range of retrograde condensation, separating liquids in the stream from uncondensed gas at a high pressure, carrying off the uncondensed gas, conducting a portion of the separated liquids from the separation step, conducting another portion of the separated liquids from the separation step, heating the last-named portion of the liquids to raise the temperature thereof, and injecting liquids which have been heated into the flowing stream in advance of the separating step, while maintaining said stream under a high pressure, concurrently flowing the admixed fluids while subjected to surficial contact under high pressure, whereby native liquefiable fractions are precipitated and agglomerated with the liquefaction fluid and native liquids of the well stream.

16. The method of recovering native hydrocarbon products from a well at pressures within the range of retrograde condensation which includes, flowing a well stream including said native hydrocarbon products from the well at a pressure within the range of retrograde condensation, admixing with the well stream a comparatively heavy liquefaction liquid including hydrocarbon components substantially the same as some of the native hydrocarbon components recoverable from the well stream in such quantities as to induce precipitation of liquefiable fractions of the well stream while maintaining said stream under high pressure, separating the uncondensed gaseous fluids from said streams at a high pressure, carrying off recovered liquids from the separation step, flowing the uncondensed gaseous fluids from the separation step, admixing with the stream of uncondensed gaseous fluids a liquefaction fluid including some of the hydrocarbon components to be recovered from the well stream and in such quantities as to induce precipitation and increased recovery of liquefiable fractions from the said gaseous stream while maintaining said stream under high pressure, flowing the admixed fluids while subjected to surficial contact under high pressure, whereby the native liquefiable fractions are precipitated and agglomerated with the liquefaction fluid and condensed liquids of said stream, and separating gas from the said agglomerated liquids under high pressure within said high pressure range.

17. The method of recovering native hydrocarbon products from a well at pressures within the range of retrograde condensation which includes, flowing a well stream including said native hydrocarbon products from the well at a pressure within the range of retrograde condensation, primarily extracting from the well stream heavier hydrocarbon liquids than those which are to be ultimately recovered, cooling the well stream after such primary extraction, admixing with the well stream a liquefaction fluid including hydrocarbon components of substantially the same composition as some of the native hydrocarbon components recoverable from the well stream and in such quantities as to induce precipitation and increased recovery of liquefiable fractions of the well stream while maintaining said stream under a high pressure, flowing the admixed fluids concurrently while subjected to surficial contact under high pressure, whereby native liquefiable fractions are precipitated and agglomerated with the liquefaction fluid and the native liquids of the well stream, and separating the gas from the agglomerated liquids under high pressure within said retrograde condensation range.

18. The method of recovering liquefiable hydrocarbon constituents from distillate type wells which includes, flowing the stream from the well under high pressure within the range of retrograde condensation, cooling the gas stream by admixing therewith a cold liquefaction medium while maintaining high pressure to condense liquefiable hydrocarbon constituents, flowing the admixture concurrently in intimate contact to amplify the condensation of liquefiable hydrocarbon constituents, conducting the admixture in an elongate path to a point of separation and separating the uncondensed gas from the admixture at a pressure within the retrograde condensation range, carrying off gas from the point of separation at a pressure within the range of retrograde condensation, carrying off a portion of the liquids, and recirculating another portion of the liquids as the cooling and liquefaction medium.

JAY P. WALKER.
EDWIN V. FORAN.